United States Patent

Kanetake

Patent Number: 5,469,326
Date of Patent: Nov. 21, 1995

[54] SOLID ELECTROLYTIC CAPACITOR

[75] Inventor: Yasuo Kanetake, Kyoto, Japan

[73] Assignee: Rohm Co., Ltd., Kyoto, Japan

[21] Appl. No.: 133,342

[22] Filed: Oct. 8, 1993

[30] Foreign Application Priority Data

Oct. 15, 1992 [JP] Japan .................................. 4-277399

[51] Int. Cl.$^6$ .................................................. H01G 9/04
[52] U.S. Cl. ......................... 361/534; 361/529; 361/533; 361/540
[58] Field of Search ........................... 361/274.1, 275.4, 361/301.3, 528, 529, 532, 533, 534, 535, 538, 539, 540, 531; 29/25.03, 25.42

[56] References Cited

U.S. PATENT DOCUMENTS

| 4,288,842 | 9/1981 | Voyles | 361/540 |
| 4,675,790 | 6/1987 | DeMatos et al. | 361/540 |
| 4,720,772 | 1/1988 | Yamane et al. | 361/534 |
| 4,907,131 | 3/1990 | Neal | 361/534 |
| 5,007,149 | 4/1991 | Schnabel | 29/25.03 |
| 5,179,507 | 1/1993 | Iijima | 361/534 |

FOREIGN PATENT DOCUMENTS

| 2087612 | 3/1990 | Japan | 361/534 |
| 3292715 | 12/1991 | Japan | 361/531 |

Primary Examiner—Bruce A. Reynolds
Assistant Examiner—Gregory L. Mills
Attorney, Agent, or Firm—Nikaido, Marmelstein, Murray & Oram

[57] ABSTRACT

Provided is a solid electrolytic capacitor including a capacitor element, an internal anode lead extending from a substantially central portion of one lateral surface of the capacitor element, other surfaces of the capacitor element normal to the lateral surface being adapted to serve as cathode terminal walls, an external anode lead connected to the internal anode lead, an external cathode lead connected to one of the cathode terminal wall, and a resin mold encapsulating the capacitor element as well as connecting portions associated therewith, wherein the external anode lead connected to the internal anode lead is bent to have at least two steps at its end portion, a lower step of said at least two steps being fixed to another one of the cathode terminal walls through an insulating material, an upper step of said at least two steps being fixed to the internal anode lead. The solid electrolytic capacitor prevents the capacitor element thereof from being displaced and the leads thereof from breaking, allows an easy assembling operation, and contributes to the down-scaling of a capacitor.

3 Claims, 2 Drawing Sheets

SOLID ELECTROLYTIC CAPACITOR

FIELD OF THE INVENTION

The present invention relates to solid electrolytic capacitors and, more particularly, to a solid electrolytic capacitor in which relative displacement is prevented between a capacitor element and external leads (or wires) upon encapsulation molding with resin, and which allows down-scaling of its package.

BACKGROUND OF THE INVENTION

A prior art solid electrolytic capacitor is illustrated in FIG. 3 and wherein an internal anode lead 22 is extending from a central portion of one lateral surface of a capacitor element 21 and electrically connected at its other end to an external lead 23; and one surface of the capacitor element 21 which is perpendicular to the aforesaid lateral surface serves as a cathode terminal wall 24 and is electrically connected to one end of another external lead 26 through a fuse 25. A junction coat resin (hereinafter referred to as "JCR") 27 is applied around the fuse 25 to avoid a breakage thereof upon assembly of the solid electrolytic capacitor. Further, the capacitor element 21 together with part of the external leads 23 and 26 is encapsulated with a resin mold 28, and the external leads 23 and 26 are bent as illustrated in FIG. 3.

The prior art solid electrolytic capacitor, however, causes a problem that displacement of the capacitor element 21 is likely when the internal anode lead 22 is to be connected to the external lead 23 since the capacitor element 21 is not held by the external leads. If such a correction is made with the displacement remaining, the capacitor element 21 may become exposed from the resin mold, or a breakage of wire may occur. For the reason that the exposure of the capacitor element 21 must be avoided, the resin mold cannot be reduced in size.

Further, the capacitor element 21 is held only by the thin internal lead even after the connection is made between the internal anode lead 22 and the external lead 23. Hence, deformation of the capacitor element 21 is likely. This results in incomplete support for the capacitor element 21, exertion of excessive mechanical stress, and likelihood of misregistration or breakage of wires.

SUMMARY OF THE INVENTION

The present invention has been attained in view of the foregoing problems. It is, therefore, a primary object of the present invention to provide a solid electrolytic capacitor capable of preventing displacement of a capacitor element thereof which is likely upon encapsulation with a resin mold.

According to the present invention, there is provided a solid electrolytic capacitor comprising a capacitor element, an internal anode lead extending from a substantially central portion of one lateral surface of the capacitor element, other surfaces of the capacitor element perpendicular to the lateral surface being adapted to serve as cathode terminal walls, an external anode lead connected to the internal anode lead, an external cathode lead connected to one of the cathode terminal walls, and a resin mold encapsulating the capacitor element as well as connecting portions associated therewith, wherein the external anode lead connected to the internal anode lead is bent to have at least two steps at its end portion, a lower step of said at least two steps being fixed to said one of the cathode terminal walls through an insulating material, an upper step of said at least two steps being fixed to the internal anode lead.

Preferably, the internal anode lead is supported at its connecting portion by the upper step of the external anode lead through an intervening insulating material and electrically connected to the external anode lead through a fuse.

Further, preferably, a junction coat resin is provided in the periphery of the internal anode lead and which also covers the lateral surface of the capacitor element from which the internal anode lead is extending.

Further, the external cathode lead connected to the cathode terminal wall is preferably bent to be L-shaped at its end portion to sandwich and hold the capacitor element cooperatively with the lower step of the external anode lead.

Still further, the external cathode lead and external anode lead come out of the resin mold at different heights from the bottom of the resin mold.

In the present invention, the external anode lead connected to the internal anode lead is bent to have at least two steps at its end portion adjacent to the connecting portion, and a lower step thereof supports the capacitor element with interposing the insulating material. Hence, the connection on the anode side can be made between the internal anode lead and the external anode lead in a stable condition. This allows a precise assembling operation without a relative displacement between the capacitor element and the external anode lead in making lead connections and encapsulation with the resin mold. Further, because of no occurrence of displacement of the capacitor element, the resin mold can be minimized in thickness to realize down-sizing of a capacitor with no breakage of wire.

DETAILED DESCRIPTION

The present invention will now be described with reference to the drawings.

Figure 1:
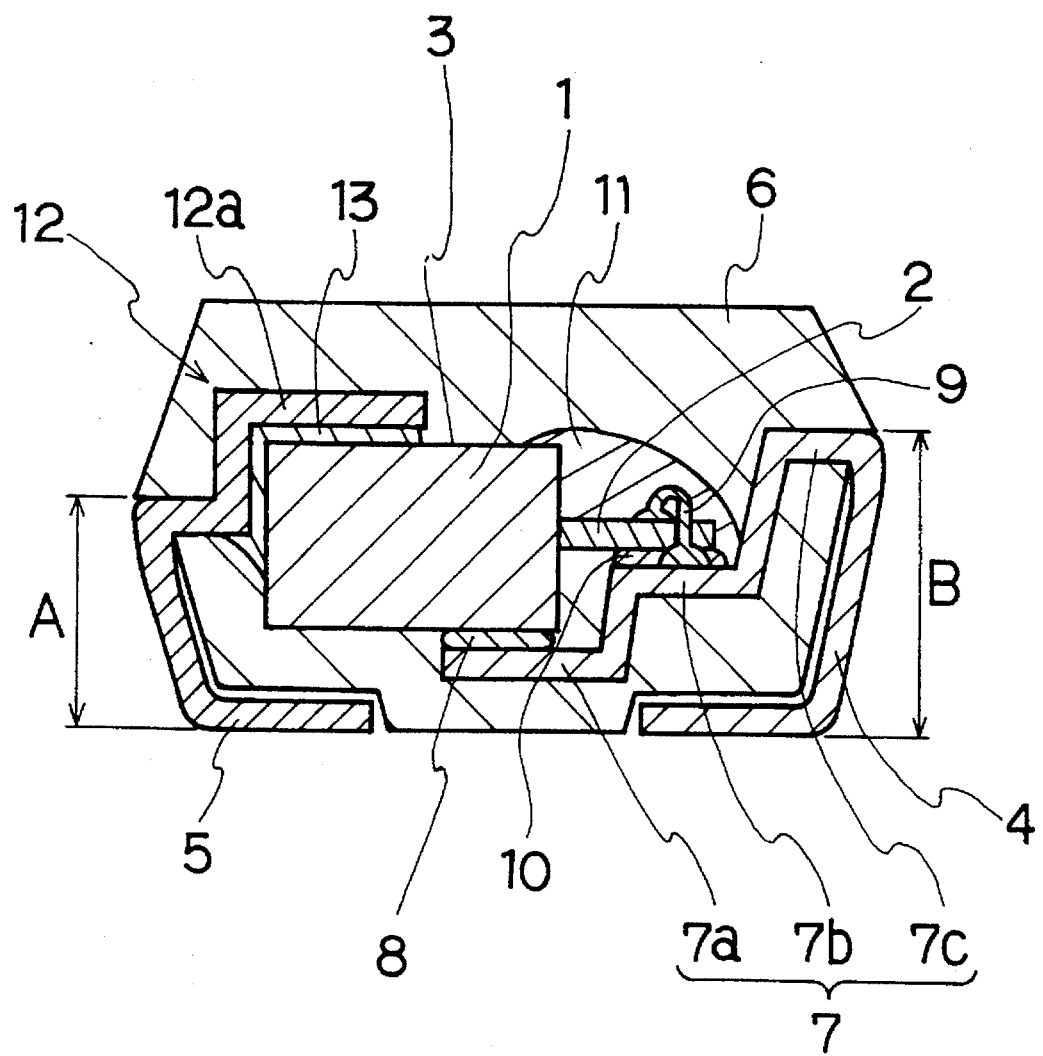
FIG. 1 is an explanatory section showing one embodiment of a solid electrolytic capacitor according to the present invention.
Figure 2:
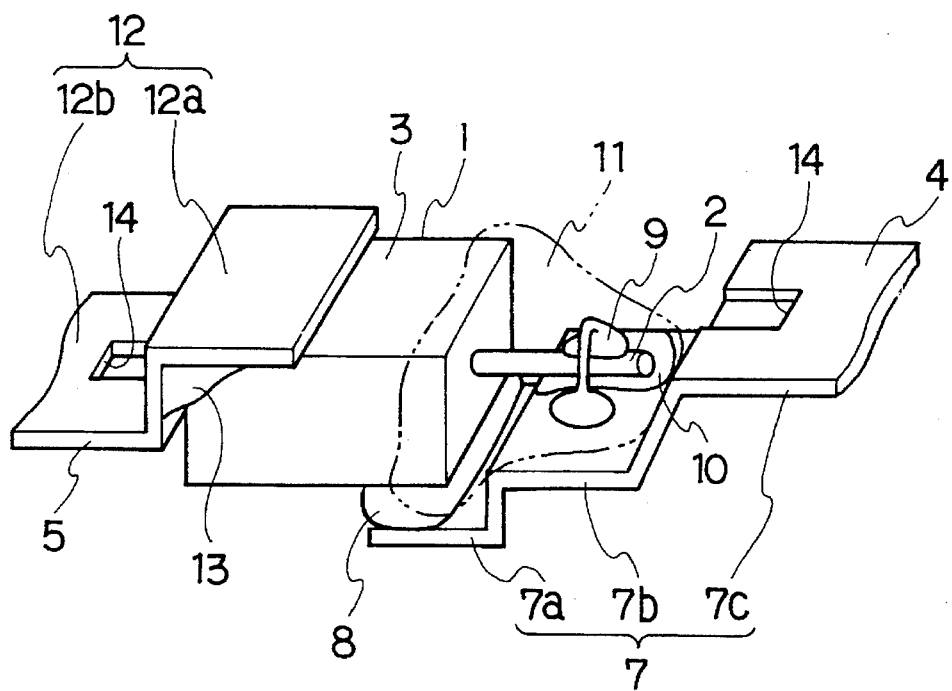
FIG. 2 is a partially enlarged perspective view showing a capacitor element of the solid electrolytic capacitor shown in FIG. 1.
Figure 3:
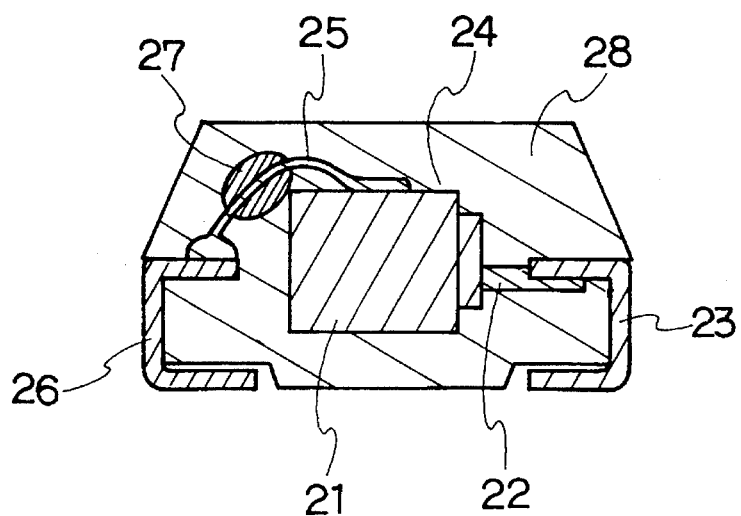
FIG. 3 is an explanatory section showing a prior art solid electrolytic capacitor.

A solid electrolytic capacitor according to the present invention is of a construction as shown in FIGS. 1 and 2. A capacitor element 1 of the subject capacitor is made of, for example, a powdery metal having a function as a valve such as tantalum, aluminum or niobium. From one lateral surface of the capacitor element is extending an internal anode lead 2. The surface of the capacitor element opposite to that lateral surface and the surfaces thereof perpendicular thereto are covered with an Ag film or a like film to serve as cathode terminal walls 3. The anode and cathode of the capacitor element 1 are electrically connected to an external anode lead 4 and an external cathode lead 5, respectively. The capacitor element 1 together with the connecting portions of the external leads 4 and 5 is encapsulated with a resin mold 6.

The external anode lead 4 is bent at its end portion in a stairs-like fashion to have three steps 7a, 7b and 7c. The lowermost step 7a in the endmost portion of the external lead 4 supports the capacitor element 1. Since the external anode lead 4 is fixed to the cathode terminal wall of the capacitor element 1 for supporting the capacitor element 1, an insulating material 8 is provided therebetween for insulation. The insulating material 8 is composed of, for example, polybutadiene. By virtue of this feature, the operation of connecting the internal anode lead 2 to the external anode lead 4 is achieved with the capacitor element 1 stationarily placed on the step 7a, so that displacement of the capacitor element 1 hardly occurs. This minimizes the faults ascribable to such displacement, such as breakage of wire and exposure of the capacitor element 1 from the resin mold, and allows assembly of the capacitor with good precision.

To the second step 7b of the external lead 4 is connected the internal anode lead 2. In the present embodiment, unlike the prior art capacitor, a fuse 9 intervenes between the internal anode lead 2 and the external anode lead 4, and the internal anode lead 2 is fixed to the second step 7b through an insulating material 10. The fuse 9 is pressure-welded at its one end to the internal lead 2 and electrically connected at its other end to the step 7b. By this feature reductions can be realized in the length of the fuse 9 and in the distances between the surfaces of the capacitor element 1 and the outer surfaces of the resin mold 6, as compared with the prior art capacitor in which a fuse is provided on the cathode terminal side. Thus, down sizing of a solid electrolytic capacitor is feasible.

A JCR 11 is provided around the internal anode lead 2 to prevent breakage of the fuse 9. The JCR 11 also prevents the mold resin from exfoliating from the capacitor element 1 due to stress produced upon molding because it covers an electrolyte such as $MnO_2$ or an oxide film which is exposed on the lateral surface from which the internal lead 2 is extending. Further, when the fuse 9 is cut off by fusion, the JCR 11 allows the cut portions of the fuse 9 to readily be rounded thereby forming a sufficiently long clearance between the opposite cut portions.

The external cathode lead 5 is bent at its end portion to have an L-shaped portion 12 such as to sandwich and hold the capacitor element 1 cooperatively with the step 7a of the external anode lead 4. A horizontal portion 12a at the endmost of the external lead 5 which forms part of the L-shaped portion 12 extends to above the capacitor element 1 and is bonded to the top surface thereof by means of an electrically conductive adhesive 13. Thus, the capacitor 1 is securely held by and fixed to this L-shaped portion 12 and the step 7a of the external anode lead 4 in a sandwiched fashion. The capacitor element 1 is thus supported securely from below and from above, so that the displacement thereof which would occur upon encapsulation molding can assuredly be prevented. Although the capacitor element 1 is preferably supported by both the L-shaped portion 12 and the step 7a for stability, supporting by the step 7a only can perform the effect of preventing the displacement of the capacitor element 1. The aforesaid electrically conductive adhesive 13 is composed of, for example, an epoxy resin containing Ag or Cu as a filler.

In the present embodiment the external lead 4 comes out of the resin mold 6 at the level of the third step 7c thereof. As shown in FIG. 1, the height B from the bottom of the resin mold 6 to the location at which the external anode lead 4 comes out of the resin mold 6 is made different from the height A from the bottom of the resin mold 6 to the location at which the external cathode lead 5 comes out of the resin mold 6. This difference in height allows the poles of the resultant solid electrolytic capacitor to be easily distinguished from each other.

Further, as shown in FIG. 2, through holes 14 are provided in the respective bending portions of the external leads 4 and 5. These through holes 14 permit the resin mold 6 to extend therethrough then set in encapsulating the capacitor element 1 etc. with the resin mold 6 by molding. This results in an enhanced adherence between the external leads 4 and 5 and the resin mold 6. Accordingly, the resultant solid electrolytic capacitor is prevented from exfoliation between the resin mold 6 and the leads and cracking of the resin mold 6 due to heat cycle thereby improving the moisture resistance thereof.

Note that although the external anode lead is made to have three steps in the present embodiment, the number of steps thereof can be selected as desired as far as it is at least two, one for supporting the capacitor element, the other for a connection with the internal lead.

According to the present invention, as has been described, the provision of steps to the external anode lead makes it possible to minimize exposure faults and molding faults due to the displacement of the capacitor element or misregistration thereof with leads. Further, the present invention provides an inexpensive, small-sized solid electrolytic capacitor of good quality which allows easy assembly of itself.

Further, the provision of the JCR around the internal anode lead enables to prevent breakage of the fuse which would occur upon molding while protecting the surface of the capacitor element on which the electrolyte thereof is exposed. Accordingly, the solid electrolytic capacitor is improved in heat resistance upon soldering and in resistance against heat cycle.

Still further, the external anode lead comes out of the resin mold at a height different from that at which the external cathode lead comes out of the same, whereby the respective polarities of the external leads can easily be distinguished from each other at a glance, leading to improved operability in mounting the solid electrolytic capacitor.

Though several embodiments of the present invention are described above, it is to be understood that the present invention is not limited only to the above-mentioned, various changes and modifications may be made in the invention without departing from the spirit and scope thereof.

What is claimed is:

1. A solid electrolytic capacitor comprising:

a capacitor element;

an internal anode lead extending from a substantially central portion of one lateral surface of the capacitor element, other surfaces of the capacitor element perpendicular to said one lateral surface being adapted to serve as cathode terminal walls;

an external anode lead electrically connected to the internal anode lead through a fuse which is directly attached to said external and internal anode leads;

an external cathode lead electrically connected to one of the cathode terminal walls; and a resin mold encapsulating the capacitor element as well as connecting portions associated therewith, wherein the external anode lead connected to the internal anode lead, is bent to have at least two steps at one end portion, a lower step of said at least two steps being fixed to another one of the cathode terminal walls through an electrically insulating material, an upper step of said at least two steps being fixed to the internal anode lead through an intervening electrically insulating material, said external cathode lead is bent to be L-shaped at one end portion to sandwich and hold said capacitor element cooperatively with said lower step of the external anode lead.

2. The solid electrolytic capacitor of claim 1 further comprising a junction coat resin provided in a periphery of the internal anode lead which also covers said one lateral surface of said capacitor element from which said internal anode lead is extending.

3. The solid electrolytic capacitor according to claim 1, wherein said external cathode lead and said external anode lead come out of said resin mold at different heights from a bottom of said resin mold.

* * * * *